US011727636B2

(12) United States Patent
Aigerman

(10) Patent No.: US 11,727,636 B2
(45) Date of Patent: *Aug. 15, 2023

(54) THREE-DIMENSIONAL MESH SEGMENTATION

(71) Applicant: Adobe Inc., San Jose, CA (US)

(72) Inventor: Noam Aigerman, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/476,791

(22) Filed: Sep. 16, 2021

(65) Prior Publication Data

US 2022/0005270 A1    Jan. 6, 2022

Related U.S. Application Data

(63) Continuation of application No. 16/681,693, filed on Nov. 12, 2019, now Pat. No. 11,127,205.

(51) Int. Cl.
*G06T 17/20* (2006.01)
*G06T 15/04* (2011.01)

(52) U.S. Cl.
CPC .............. *G06T 17/20* (2013.01); *G06T 15/04* (2013.01)

(58) Field of Classification Search
None
See application file for complete search history.

(56) References Cited

U.S. PATENT DOCUMENTS

| 6,476,803 | B1 | 11/2002 | Zhang et al. |
| 6,819,966 | B1* | 11/2004 | Haeberli ............... G06T 19/00 700/98 |
| 8,355,020 | B1 | 1/2013 | Hanau et al. |
| 11,127,205 | B2* | 9/2021 | Aigerman ............. G06T 15/04 |
| 2002/0005856 | A1 | 1/2002 | Sasaki |
| 2002/0116159 | A1* | 8/2002 | Hux ...................... G06T 17/205 703/2 |
| 2005/0027767 | A1 | 2/2005 | Couture-Gagnon |
| 2005/0052452 | A1 | 3/2005 | Baumberg |
| 2009/0244082 | A1 | 10/2009 | Livingston et al. |

(Continued)

OTHER PUBLICATIONS

"Notice of Allowance", U.S. Appl. No. 16/681,693, filed May 19, 2021, 16 pages.

(Continued)

*Primary Examiner* — Sultana M Zalalee
(74) *Attorney, Agent, or Firm* — FIG. 1 Patents

(57) ABSTRACT

Three-dimensional (3D) mesh segmentation techniques are described. In one example, a geometry segmentation system determines a vertex direction for each vertex in a 3D mesh. A segment generation module is then employed to generate segments (e.g., as developable geometries) from the 3D mesh. To do so, a vertex selection module selects an initial vertex having an associated vertex direction. A face identification module then identifies a face in the 3D mesh using that initial vertex and at least one other vertex. A segment determination module compares the vertex direction associated with the initial vertex with a normal determined for the face. If the vertex direction is orthogonal to the normal (e.g., within a threshold amount), the face is added to the segment, and sets another one of the vertices of the face as the initial vertex and the process repeats.

20 Claims, 10 Drawing Sheets

(56) References Cited

U.S. PATENT DOCUMENTS

2011/0169828 A1* 7/2011 Pedersen ................ G06T 17/20
                                                        345/423
2014/0093146 A1   4/2014 Inane et al.
2017/0139204 A1   5/2017 Pauly et al.

OTHER PUBLICATIONS

"Pre-Interview First Office Action", U.S. Appl. No. 16/681,693, filed Apr. 23, 2021, 11 pages.
Julias, Dan et al., "D-Charts: Quasi-Developable Mesh Segmentation", Oct. 2005, 10 pages.
Stein, Oded et al., "Developability of Triangle Meshes", ACM Trans. Graph., vol. 37, No. 4, Article 77, Aug. 2018, 14 pages.

* cited by examiner

THREE-DIMENSIONAL MESH SEGMENTATION

RELATED APPLICATIONS

This application claims priority under 35 U.S.C. § 120 as a continuation of U.S. patent application Ser. No. 16/681,693, filed Nov. 12, 2019, and titled "Three-Dimensional Mesh Segmentation," the entire disclosure of which is hereby incorporated by reference.

BACKGROUND

A three-dimensional (3D) mesh is a type of digital content that is formed from a collection of vertices and edges. Vertices are a position defined using coordinates (e.g., in 3D space) and may include additional metadata such as color, texture coordinates, and so on. Edges define a connection between two vertices in the mesh. The vertices and edges form faces, which are a closed set of edges, that together define an overall shape of the 3D mesh for use in computer graphics, geometric modeling, and so on. Faces, for instance, may be formed using triangles as a triangle mesh, quadrilaterals as a quadrilateral mesh, or other polygons as a polygon mesh.

Another type of digital content is referred to as a developable geometry. A developable geometry is a segment that may be created by bending and folding flat sheets. Segments configured as a developable geometry may be used to represent primitive shapes such as cones, cylinders, piecewise-flat surfaces such as a cube, as well as intricate shapes. Developable geometries are used to support a variety of computing device features. Examples of these features include texture painting in which the developable geometry is overlaid in a UV space in two-dimensions (by reversing the bending and folding process to bring it back to being flat) for painting using a texture that is then applied to the 3D mesh. The texture painting serves as an aid to selection of the segment in a user interface, for shape inference based on segments of the 3D mesh that have a developable geometry (e.g., to distinguish between a neck and body of a guitar), and so on.

Conventional techniques used by a computing device to segment a 3D mesh into a developable geometry, however, are prone to error, inefficient. As such, conventional segmentation techniques do not support the features for which the developable geometries are developed, e.g., for conversion into a UV space for texture painting.

SUMMARY

Three-dimensional (3D) mesh segmentation techniques are described that overcome the inaccuracies and computational inefficiencies of conventional techniques to generate segments as developable geometries from a 3D mesh. These techniques are capable of identifying developable surfaces (e.g., may be addressed as flat and smooth within a threshold amount), such as swirled ribbons and other curved faces, in 3D mesh that are incapable of being identified using conventional techniques.

In one example, a geometry segmentation system begins with use of a direction determination module to determine a vertex direction for each vertex in a 3D mesh. A segment generation module is then employed to generate segments (e.g., as developable geometries) from the 3D mesh. To do so, a vertex selection module selects an initial vertex from a queue having an associated vertex direction. A face identification module then identifies a face in the 3D mesh using that initial vertex and at least one other vertex. The face is a closed set of edges including an edge that connects the initial vertex and the at least one other vertex.

The face is passed to a face normal module to determine a normal of the face, e.g., as orthogonal to a plane formed by the face. The normal of the face is then passed to a segment determination module to determine whether to add the face to a segment. To do so, the segment determination module compares the vertex direction associated with the initial vertex with the normal determined for the face. If the vertex direction is orthogonal to the normal (e.g., within a threshold amount), the face is added to the segment. If not, another face is selected by the face selection module and the process repeats, e.g., until additional vertices are not available.

In addition to adding the face to the segment, the segment determination module causes the vertex selection module to add vertices that form the face, other than the initial vertex, to a queue for further consideration in forming additional faces for consideration to add to the segment. The vertex selection module, for instance, may select a vertex from the queue as the initial vertex and use a vertex direction that is associated with the selected vertex. In this way, the vertex direction used to determine whether to add a face to the segment is set locally (as opposed to globally as in conventional techniques) and as such may address curvature that is not possible in conventional techniques as further described in the following sections.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
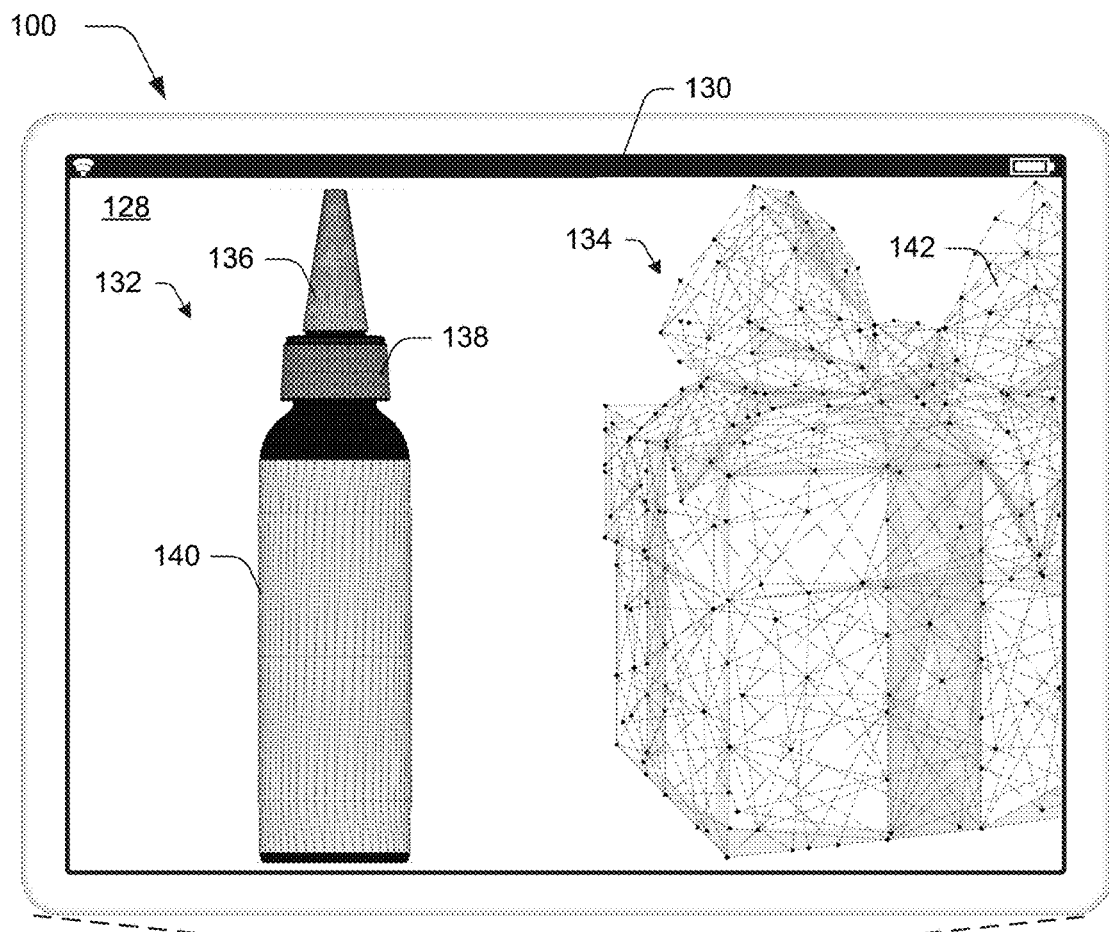
FIG. 1 is an illustration of an environment in an example implementation that is operable to employ three-dimensional (3D) mesh segmentation techniques described herein.
Figure 1:
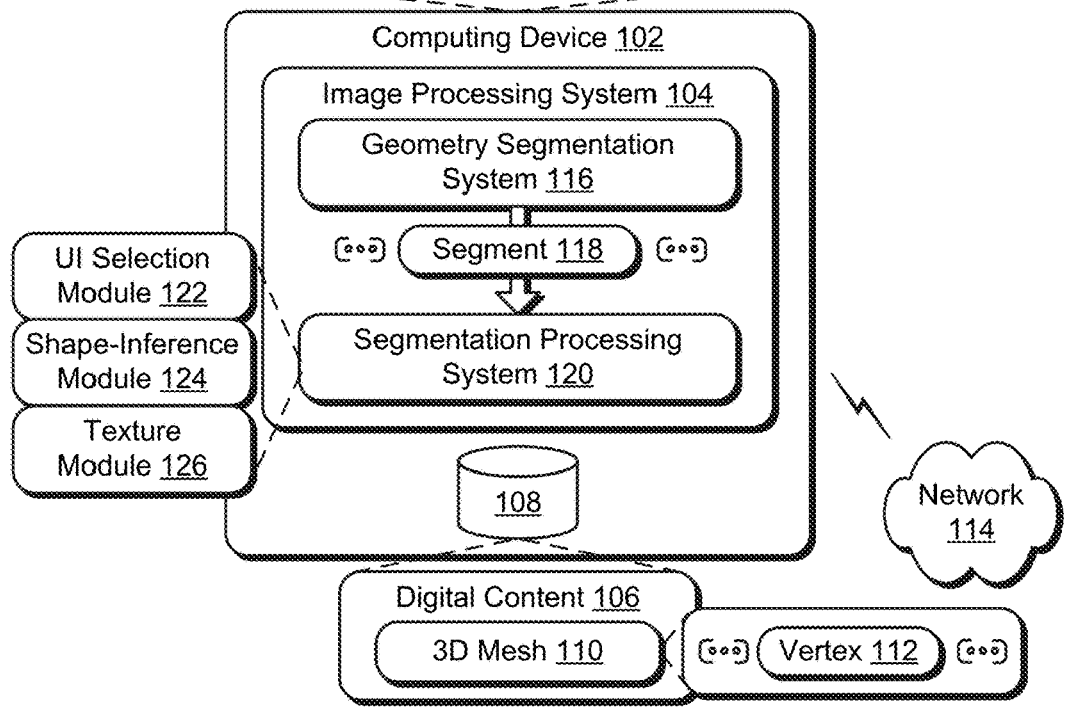

Developable geometries may be used to support a variety of functionality by a computing device, such as texture painting, shape inference, segment selection, and so on. As previously described, a developable geometry is a segment that may be created by bending and folding flat sheets. Segments configured as a developable geometry may be used to represent primitive shapes such as cones, cylinders, piecewise-flat surfaces such as a cube, as well as intricate shapes.

Conventional techniques used to segment 3D mesh into developable geometries, however, often fail to identify the developable geometries contained in the 3D mesh, are computationally inefficient, and typically produce a segmentation that is not readily usable for UV layouts and as such does not support texture painting. In one conventional example, a 3D mesh is segmented into a collection of small parts instead of into a single large patch as a developable geometry and thus does not readily support techniques that rely on developable geometries, such as texture painting. In another conventional example, the 3D mesh is segmented into parts based on comparison to a global vector and not a local direction of curvature for the segment and thus cannot address segments having curved sections, e.g., a ribbon. Therefore, both of these conventional examples are incapable of identifying a variety of developable geometries.

Accordingly, 3D mesh segmentation techniques are described that overcome the inaccuracies and computational inefficiencies of conventional techniques to generate segments as developable geometries from 3D mesh, e.g., developable geometries as discretized from the 3D mesh into a developable surface. A 3D mesh is not perfectly developable in every instance in that it may not smooth and thus does not lay completely flat as in a typical developable geometry. A 3D mesh forming a cylinder, for instance, when viewed closely is formed piecewise from faces that are individually flat to form a curve. Thus, faces that make up the mesh do not form a perfectly flat surface, one to another. Accordingly, a segment of a 3D mesh as converted into a developable geometry in the following refers to discretization of a developable surface that is flat and smooth within a threshold amount.

In this way, these techniques are capable of identifying developable surfaces, such as ribbons and other curved faces, in a 3D mesh that are incapable of being identified using conventional techniques. This may be performed by a geometry segmentation system by updating a basis to detect curvature "as you go" to add faces of the 3D mesh locally, as opposed to comparison with a global curvature value of conventional techniques. As a result, the techniques described herein may address developable geometries in the 3D mesh having continued and/or varied curvature (e.g., a ribbon), which is not possible using conventional techniques.

In one example, a geometry segmentation system begins with use of a direction determination module to determine a vertex direction for each vertex in a 3D mesh. The vertex direction is a local quantity for each vertex that is based on an amount of curvature of that vertex and a direction vector for which curvature is the smallest. The vertex direction is also referred to as a "ruling" that describes a direction of least curvature at the vertex in the 3D mesh. Curvature and ruling are further defined mathematically in the following sections. The vertices and associated vertex directions are then passed from the direction determination module to a segment generation module.

The segment generation module is configured to generate segments (e.g., as developable geometries) from the 3D mesh. To do so, a vertex selection module selects an initial vertex having an associated vertex direction. This may be performed in a variety of ways, such as to select the initial vertex having a least amount of curvature and that has not already been processed by the segment generation module. This initial vertex is then be added to a queue by the vertex selection module.

For each vertex identified by the vertex selection module, a face identification module is then employed to identify a face in the 3D mesh using that vertex and at least one other vertex, e.g., that is adjacent to the vertex in the 3D mesh. The face is a closed set of edges including an edge that connects the initial vertex and the at least one other vertex. Faces, for instance, may be formed using triangles as a triangle mesh, quadrilaterals as a quadrilateral mesh, or other polygons as a polygon mesh.

The face, once identified by the face identification module, is passed to a face normal module to determine a normal of the face. The normal is a direction orthogonal to a surface of the face. The normal is then passed to a segment determination module to determine whether to add the face to a segment being generated by the segment generation module. To do so, the segment determination module compares the vertex direction associated with the vertex selected from the queue with the normal determined for the face. If the vertex direction is orthogonal to the normal (e.g., within a threshold amount), the face is added to the segment. If not, another face is selected and the process repeats, e.g., until additional faces are not available for that vertex.

In addition to adding the face to the segment, the segment determination module causes the vertex selection module to add vertices that form the face, other than the currently evaluated vertex (the initial vertex in this example), to the queue for further consideration in forming additional faces for evaluation of whether to add the faces to the segment. Thus, as faces are added to the segment corresponding vertices are added to the queue for further evaluation. The vertex selection module, for instance, may select a vertex from the queue as the next vertex to be used in the face selection module. This "new" vertex is then used as a basis to generate a face, and the normal is used as a basis to determine whether to add this face to the segment, add vertices from the face to the queue if the vertex is added to the segment, and so on. The vertex direction of each vertex, for instance, may be set as the vertex direction determined by the direction determination module for that vertex. In this way, the vertex direction used to determine whether to add a face to the segment is set locally (as opposed to globally as in conventional techniques) and as such may address curvature that is not possible in conventional techniques.

This process may repeat for additional vertices and faces until a stopping condition is reached, e.g., additional vertices are not available, each face has been processed, and so on. Accordingly, the segment generation module may employ a flooding technique to evaluate vertices and corresponding faces of the 3D mesh for adding to the segment in a manner that is based on local curvature and thus overcomes the limitations of conventional techniques and improves computational efficiency and accuracy. Further discussion of these and other examples is included in the following sections.

Terms

"Three-dimensional (3D) mesh" is a type of digital content that is formed from a collection of vertices and edges. "Vertices" are a position defined using coordinates (e.g., in three-dimensional space) and may include additional metadata such as color, texture coordinates, and so on. "Edges" define a connection between two vertices in the mesh.

"Faces" are a closed set of edges, that together define an overall shape of the 3D mesh for use in computer graphics, geometric modeling, and so on. Faces, for instance, may be formed using triangles as a triangle mesh, quadrilaterals as a quadrilateral mesh, or other polygons as a polygon mesh.

A "developable geometry" is a surface that may be created by bending and folding flat sheets as a smooth surface. Accordingly, in the techniques described herein a developable geometry is discretized from a 3D mesh into a developable surface. A 3D mesh is not perfectly developable in every instance in that it may not smooth, which may be caused by faces that make up the mesh that are not piecewise flat. A 3D mesh forming a cylinder, for instance, when viewed closely is formed piecewise from faces that are flat to form a curvature. Therefore, a segment of a 3D mesh as converted into a developable geometry in the techniques described herein refers to discretization of a developable surface that is flat within a threshold amount. Segments configured as a developable geometry may be used to represent primitive shapes such as cones, cylinders, piecewise-flat surfaces such as a cube, as well as intricate shapes.

"UV mapping" is a process of generating a two-dimensional representation using UV coordinates of a three-dimensional object, commonly referred to as texture coordinates. U represents the horizontal axis and V represents the vertical access. UV mapping and UV coordinates support texture painting of three-dimensional objects, in which the texture is applied to the texture map and then transferred to the three-dimensional model.

A normal is defined as a line or vector that is perpendicular to a given object. In three dimensions, a surface normal or simply "normal" at a point is a line normal to a plane, e.g., the face in the examples herein.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ three-dimensional (3D) mesh segmentation techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 10.

The computing device 102 is illustrated as including an image processing system 104. The image processing system 104 is implemented at least partially in hardware of the computing device 102 to process and transform digital content 106, which is illustrated as maintained in a storage device 108 of the computing device 102. Such processing includes creation of the digital content 106, modification of the digital content 106, and rendering of the digital content 106 in a user interface for output, e.g., by a display device.

The digital content 106 in this example includes 3D mesh 110 formed using a plurality of vertices 112. 3D mesh 110, as previously described, is a type of digital content 106 that is formed from a collection of vertices 112 and edges that connect the vertices 112. Vertices 112 are a position defined using coordinates (e.g., in 3D space) and may include additional metadata such as color, texture coordinates, and so on. Edges define a connection between two vertices in the mesh. The vertices and edges form faces, which are a closed set of edges, that together define an overall shape of the 3D mesh for use in computer graphics, geometric modeling, and so on. Faces, for instance, may be formed using triangles as a triangle mesh, quadrilaterals as a quadrilateral mesh, or other polygons as a polygon mesh. Although functionality of the image processing system 104 is illustrated as implemented locally at the computing device 102, functionality of the image processing system 104 may also be implemented as whole or part via functionality available via the network 114, such as part of a web service or "in the cloud."

An example of functionality incorporated by the image processing system 104 to process 3D mesh 110 of the digital content 106 is illustrated as a geometry segmentation system 116. The geometry segmentation system 116 is representative of functionality to generate one or more segments 118 from the 3D mesh. In an example, the segment 118 is generated as a developable geometry from the 3D mesh 110 that may be created by bending and folding flat sheets. Segments configured as a developable geometry may be used to represent primitive shapes such as cones, cylinders, piecewise-flat surfaces such as a cube, as well as intricate shapes.

The segments 118, once generated, may then be leveraged in a variety of ways, functionality of which is represented by a segmentation processing system 120 of the image processing system 104. The segments 118, for instance, may be used as a basis for individualized selection within a user interface by a UI (user interface) selection module 122, e.g., to cut, paste, copy, move, and so forth within the UI. In another instance, the segments 118 are used by a shape-inference module 124 to infer characteristics of the 3D mesh 110, such as to distinguish between a neck of a guitar and a body of the guitar.

In a further instance, the segments are employed by a texture module 126 to apply and/or modify textures (e.g., colors) of the 3D mesh 110. The texture module 126, for instance, may use the segments to generate a texture map, e.g., by direct mapping into UV coordinates due to configuration as a developable geometry. A UV mapping process, for instance, may assign pixels in a two-dimensional image (e.g., the texture map) to surface mappings of polygons that form the 3D mesh. In this way, UV coordinates (i.e., texture coordinates) may be generated for each vertex 112 in the 3D mesh 110 in order to "paint" the 3D mesh 110. A variety of other examples are also contemplated.

The geometry segmentation system 116 is configured in the examples described herein to overcome the challenges, inaccuracies, and computational inefficiencies of conventional techniques to generate segments 118, e.g., as developable geometries, that are not possible using conventional techniques. A user interface 128 as rendered by a display device 130 includes a first example of a 3D mesh 110 as an applicator 132 and a second example of a 3D mesh 110 as a present 134. Conventional segment generation techniques segment a mesh in parts that have low or no curvature. As such, conventional techniques are incapable of generating segments of the applicator 132 for a nozzle 136, adjuster 138, or label 140 because of the curvature exhibited by the segments. Likewise, conventional techniques also rely on a global indication of curvature that is then used as a basis for comparison to determine whether to includes parts in a segment. As such, conventional techniques are also incapable of identifying segments that exhibit varied curvature, such as for a ribbon 142 of the present 134.

The geometry segmentation system 116 as incorporating the techniques described herein, however, is capable of doing so. The geometry segmentation system 116, for instance, may employ a flood-filling technique in which a determination of whether to add faces of the 3D mesh to a segment is performed locally, e.g., through comparison of a vertex direction as being orthogonal (within a threshold) to a normal of a face formed using the vertex. This process continues for vertices of faces added to the segment such that curvature of the faces with respect to each other may be addressed, such as to identify the nozzle 136, adjuster, 138, label 140, and/or ribbon 142, which is not possible using conventional techniques.

Figure 2:
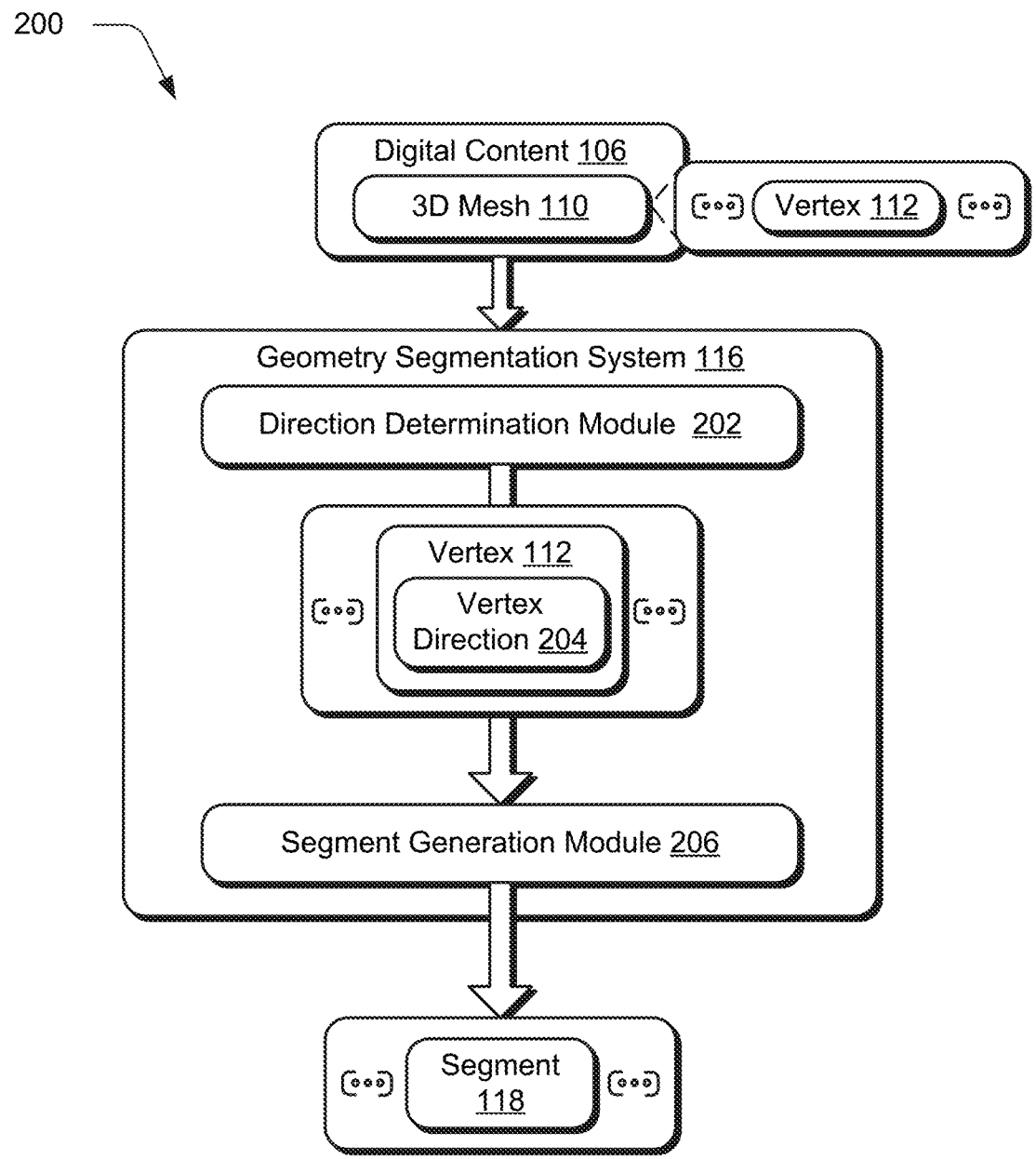
FIG. 2 depicts a system in an example implementation showing operation of a geometry segmentation system of FIG. 1 in greater detail.

FIG. 2 depicts a system 200 in an example implementation showing operation of the geometry segmentation system 116 of FIG. 1 in greater detail. The geometry segmentation system 116 in the illustrated examples receives, as an input, digital content 106 including 3D mesh 110 having a plurality of vertices 112 as previously described. The geometry segmentation system 116 includes a direction determination module 202 that is configured to generate a vertex direction 204 for the vertices 112. The vertices 112 and associated vertex directions 204 are then used as a basis to generate segments 118 by a segment generation module 206, e.g., as developable geometries. Operation of the direction determination module 202 and segment generation module 206 is described in corresponding sections in the following discussion.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Vertex Direction Determination

Figure 3:
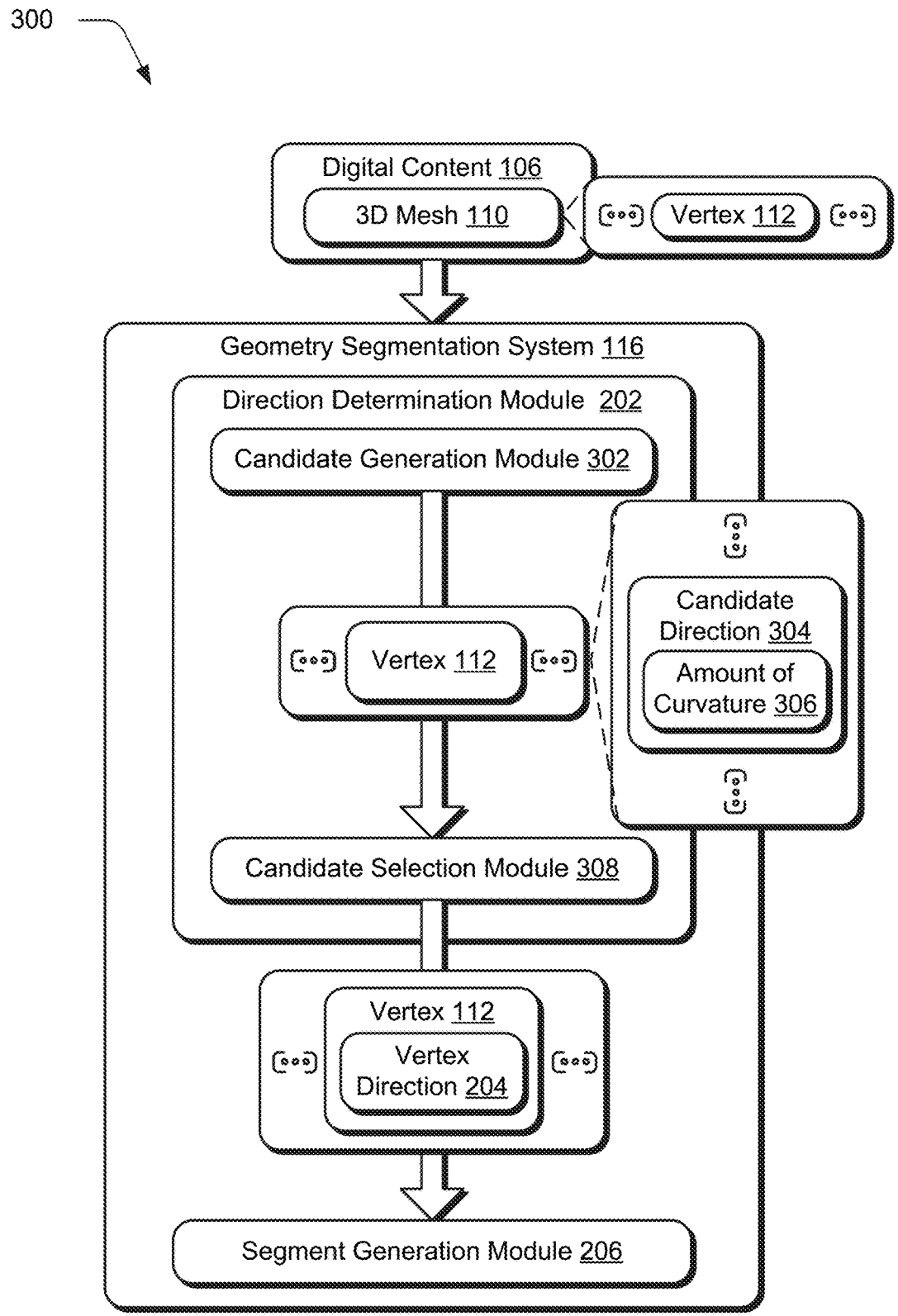
FIG. 3 depicts a system in an example implementation showing operation of a direction determination module of FIG. 2 in greater detail as generating a vertex direction for respective vertices of 3D mesh.
Figure 4:
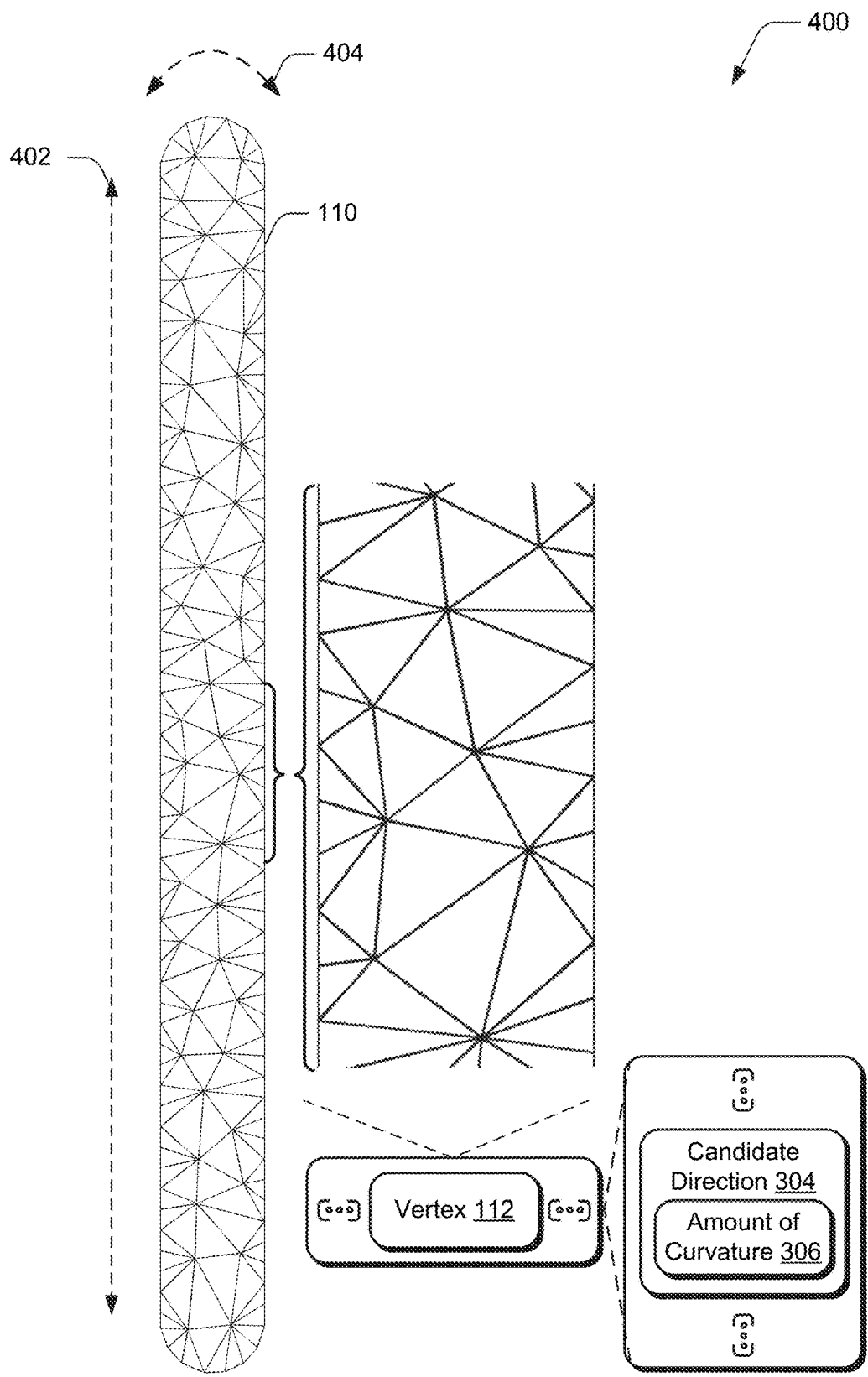
FIG. 4 depicts an example of 3D mesh and generation of candidate directions.
Figure 5:
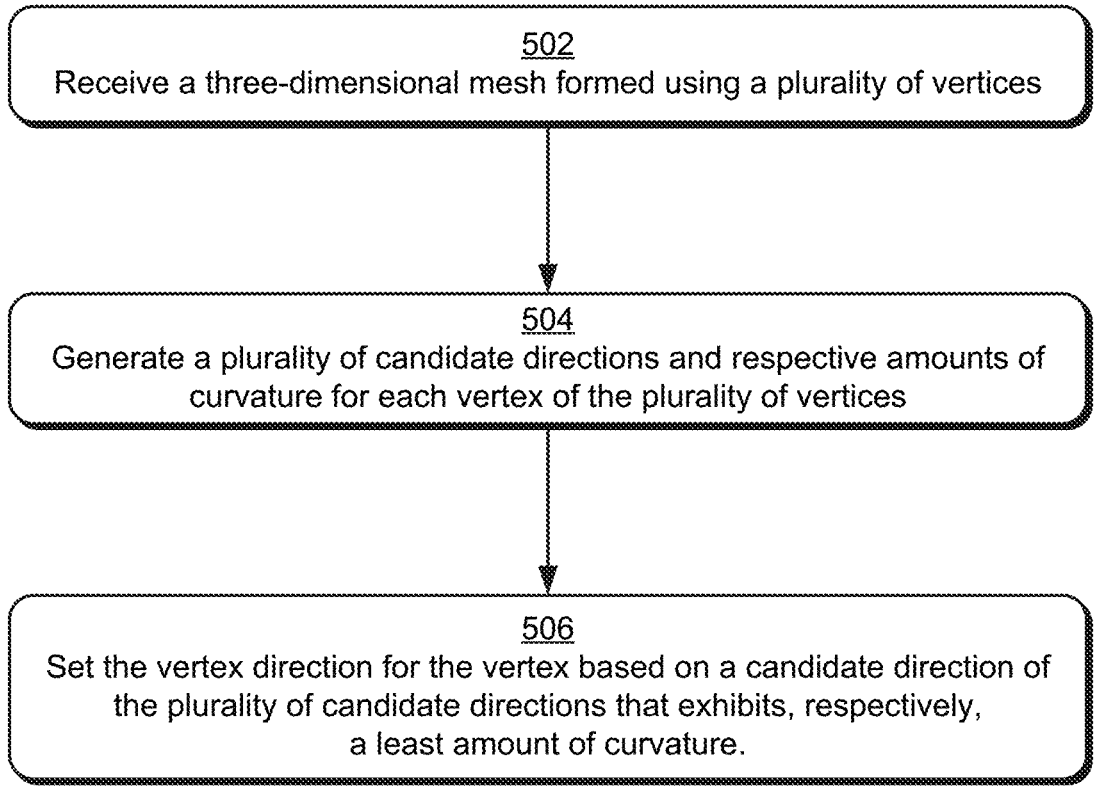
FIG. 5 is a flow diagram depicting a procedure in an example implementation in which candidate directions having respective amounts of curvature are generated and used to select a vertex direction for a respective vertex that has a relatively least amount of curvature.

FIG. 3 depicts a system 300 in an example implementation showing operation of the direction determination module 202 of FIG. 2 in greater detail as generating a vertex direction for respective vertices 112 of the 3D mesh 110. FIG. 4 depicts an example 400 of three-dimensional (3D) mesh and generation of candidate directions. FIG. 5 depicts a procedure 500 in an example implementation in which candidate directions having respective amounts of curvature are generated and used to select a vertex direction for a respective vertex that has a relatively least amount of curvature.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 3-5.

To begin in this example, a 3D mesh 110 is received by the direction determination module 202, which is formed using a plurality of vertices 112 (block 502). As before, the vertices 112 are connected via edges, and closed sets of edges form faces in the 3D mesh 110.

The 3D mesh 110 is then passed to a candidate generation module 302 of the direction determination module 202. The candidate generation module 302 is representative of functionality to generate a plurality of candidate directions 304 and a respective amount of curvature 306 for each vertex of the plurality of vertices 112 (block 504). The amount of curvature 306 describes "how strong" a surface of the 3D mesh 110 curves at the respective vertex 112 for the candidate direction. Therefore, for vertices along the cylinder the amount of curvature along the longitudinal axis 402 (e.g., as a candidate direction) is less than an amount of curvature along an axis 404 that is perpendicular to the longitudinal axis.

This is computed by the candidate generation module 302 by examining faces of the 3D mesh 110 that surround the vertex, taking their normal, and from this detecting how much "bend" is exhibited at that candidate direction 304. The curvature measured is how much the normals bend (in both directions). As shown in FIG. 4, for instance, the 3D mesh 110 as formed includes a cylindrical shape. The curvature direction is the direction that looks the most like a "hinge", i.e., the normal bends orthogonally to it as though it's an actual physical hinge.

The vertex direction 204 for the respective vertex 112 is set by a candidate selection module 308 based on a candidate direction of the plurality of candidate directions 304 that exhibits, respectively, a least amount of curvature 306 (block 506). The vertex direction 204, for instance, may be set as a direction vector for which curvature in the 3D mesh 110 for the vertex 112 is the most constant from the candidate directions 304.

Therefore, for a vertex "V," its adjacent faces may be denoted as "F1," "F2," . . . "Fk" and the normal of each face is denoted as "N1," "N2," . . . "Nk." The geometry segmentation system 116 examines each possible 3D vector that has a length of one to find a vector "U," that is most orthogonal to each of the normals.

To do so, an energy of "U" is defined to quantify deviation from orthogonality as follows:

$$E(U) = \text{sum of } (\text{dot\_product}(Ni, U))^2$$

Therefore, the geometry segmentation system 116 finds "U", such that "$\|U\|=1$" (vector has unit length) and "U" minimizes "E." "E" is a quadratic form, and therefore the optimization problem may be expressed as:

$$E(U) = U^*A^*U \text{ for some matrix } A \text{ that is defined via the normals.}$$

The curvature measure is defined as "E(U)" for "U" that minimizes the above equation. It can be shown that that curvature measure, the minimum of "E(U)," is simply the minimal eigenvalue of "A," and the ruling direction, "U," is the eigenvector corresponding to that smaller eigenvalue. Therefore, give "V," each adjacent face is found and a matrix "A" is computed having values for corresponding normals of the adjacent faces. Ruling and curvature are computed by solving an eigensystem of "A" and finding a smallest eigenvalue and eigenvector.

The vertices 112 and corresponding vertex directions 204 are then output to a segment generation module 206 to be used as a basis to generate segments in the 3D mesh, further discussion of which is included in the following section.

Segment Generation

Figure 6:
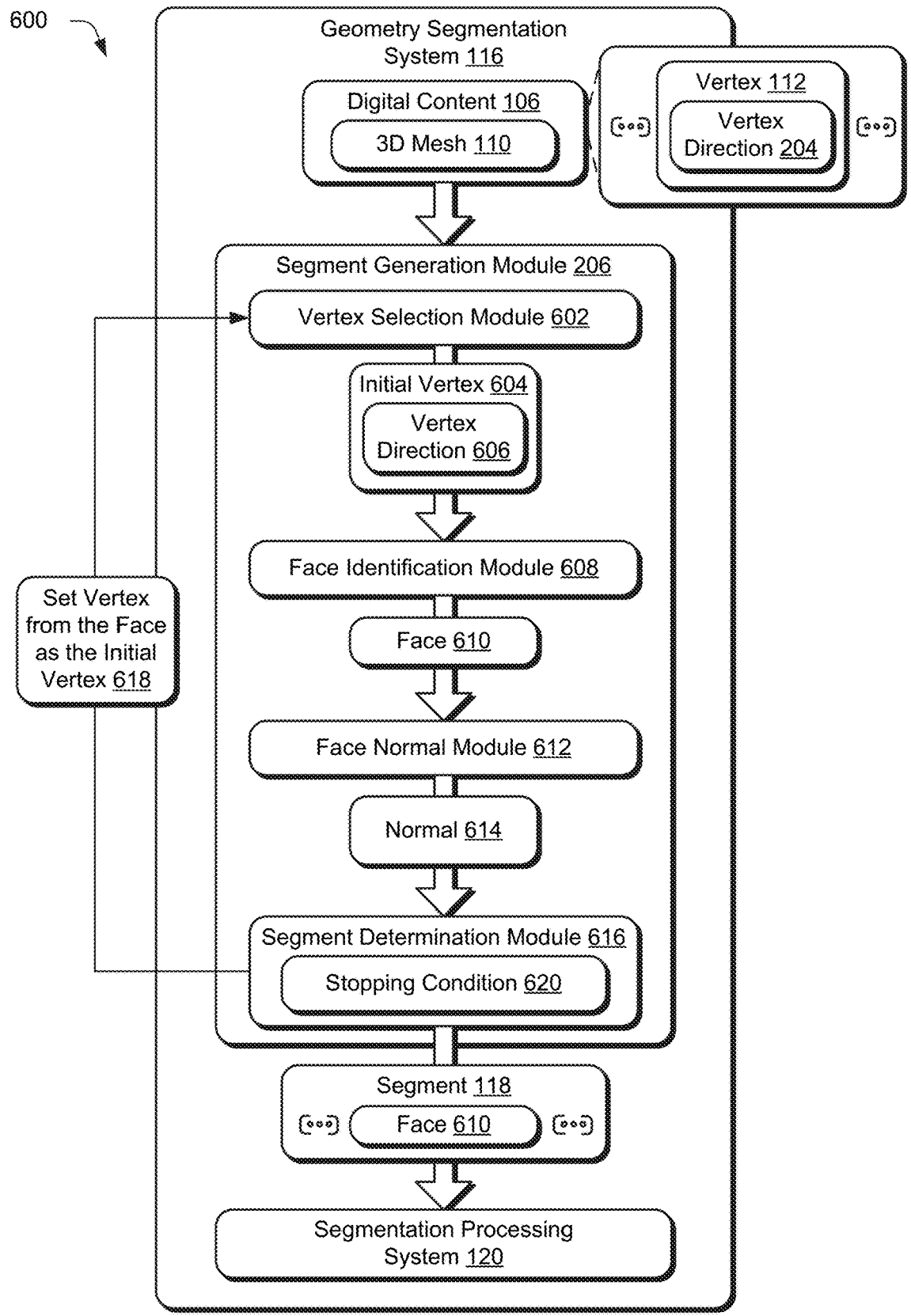
FIG. 6 depicts a system in an example implementation showing operation of a segment generation module of FIG. 2 in greater detail as generating a segment based on vertices and respective vertex directions determined as described in relation to FIG. 3.
Figure 7:
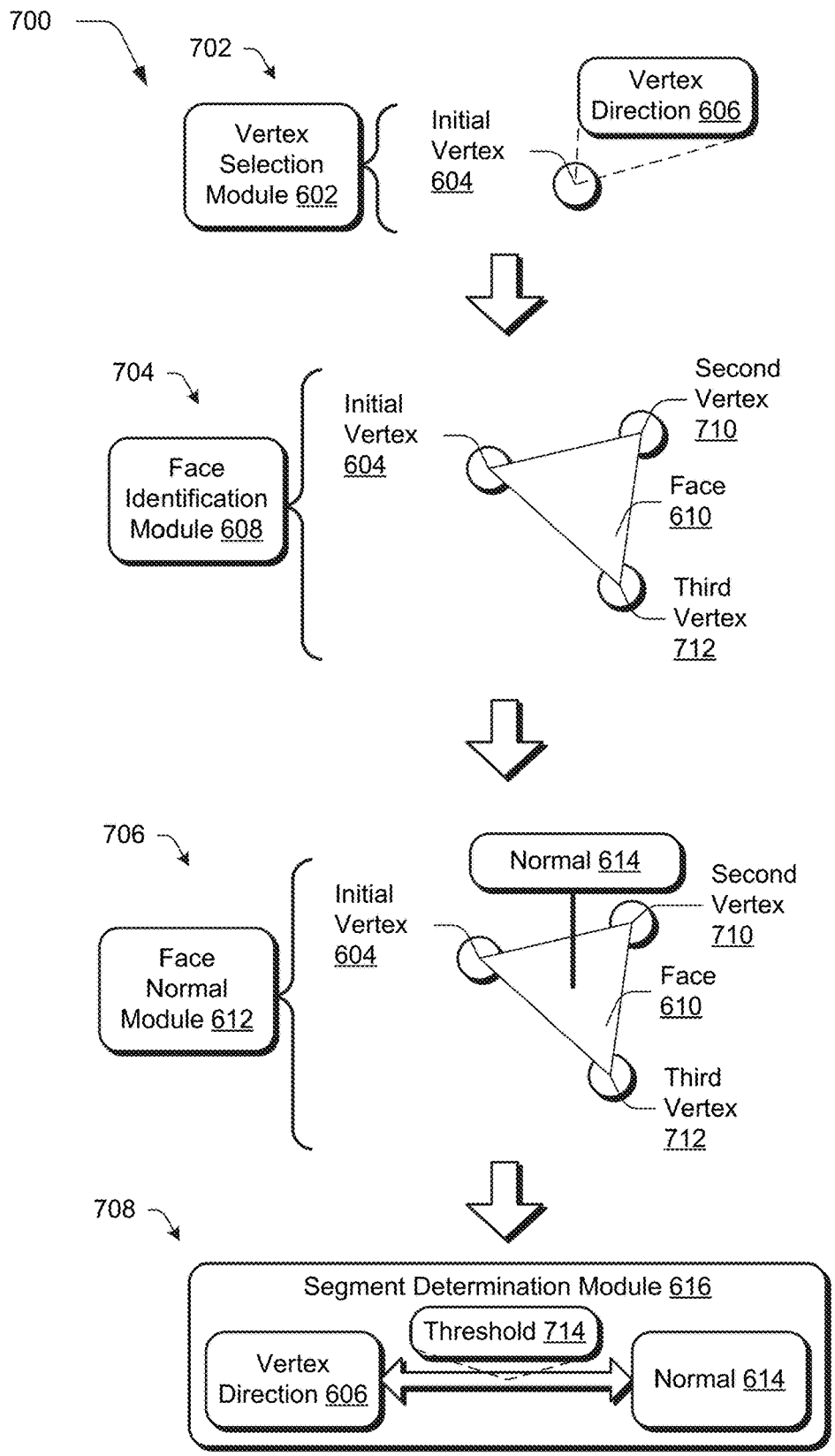
FIG. 7 depicts an example implementation showing selection of an initial vertex, identification of a face, detection of a normal to the face, and from this determining whether to add the face to the segment.
Figure 8:
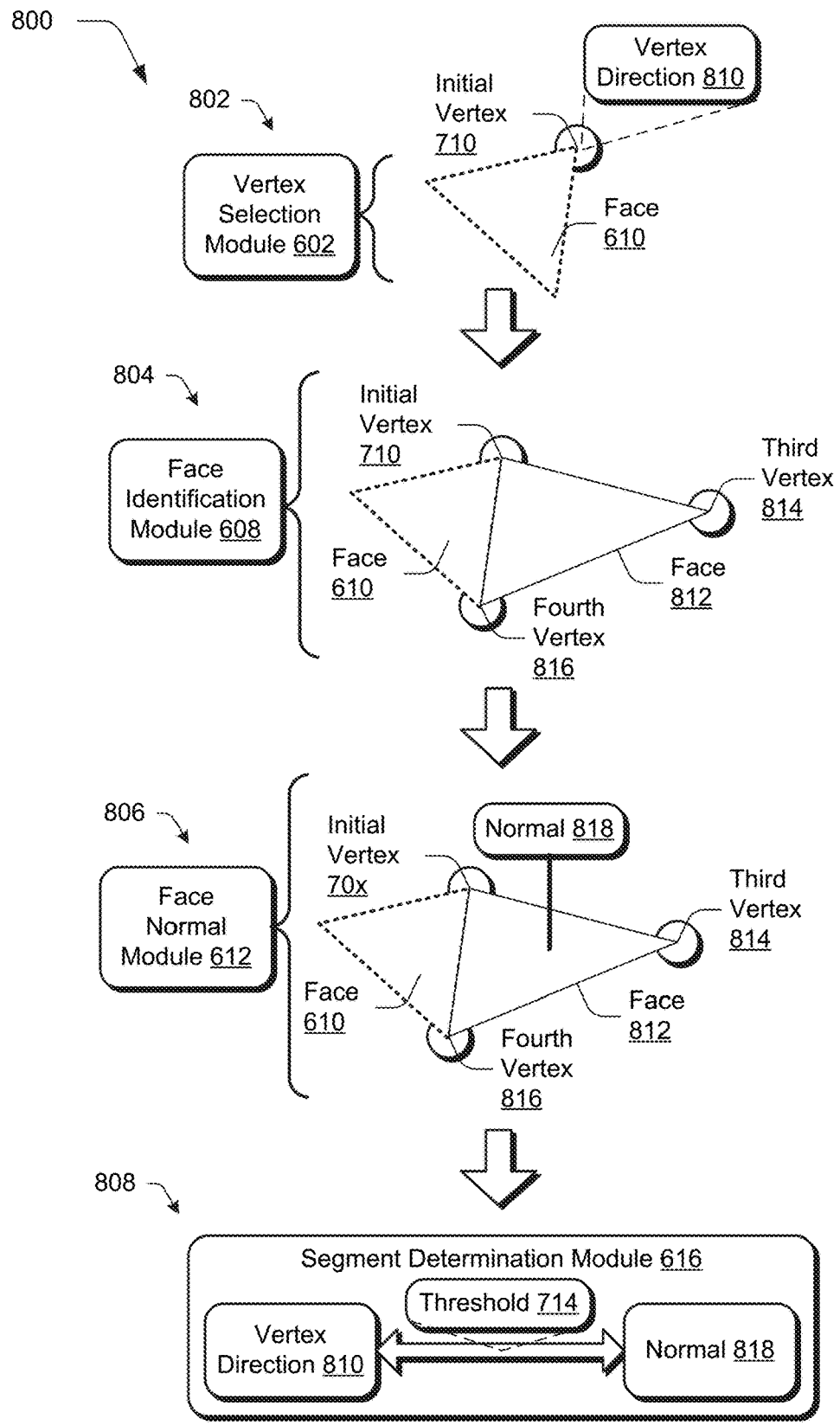
FIG. 8 depicts an example implementation in which a vertex is selected from a face added in FIG. 7 and used to identify another face, detecting a normal to the other face, and from this determining whether to add the other face to the segment as part of a flood-filling technique.
Figure 9:
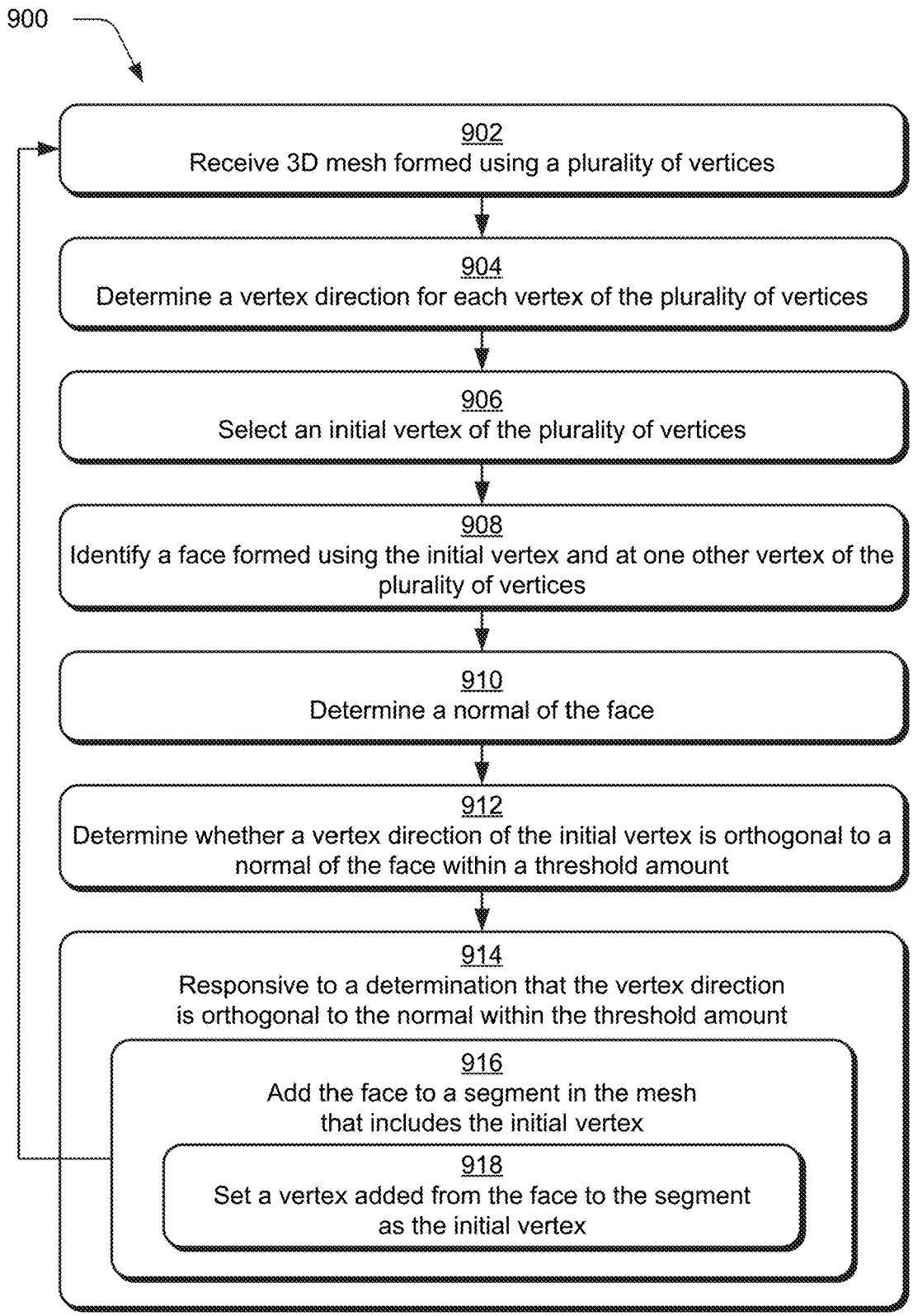
FIG. 9 is a flow diagram depicting a procedure in which a flood-filling technique is used to determine whether to add faces to a segment, e.g., as a developable geometry.

FIG. 6 depicts a system 600 in an example implementation showing operation of the segment generation module 206 of FIG. 2 in greater detail as generating a segment based on vertices 112 and respective vertex directions 204 determined as described in relation to FIG. 3. FIG. 7 depicts an example implementation 700 showing selection of an initial vertex at a first stage 702, identification a face at a second stage 704, detection of a normal to the face at a third stage 706, and from this a determination whether to add the face to the segment at a fourth stage 708. FIG. 8 depicts an example implementation 800 in which a vertex is selected from a face added in FIG. 7 at the first stage 802 and used to identify another face at a second stage 804, detect a normal to the other face at the third stage 806, and from this determine whether to add the other face to the segment as part of a flood-filling technique at the fourth stage 808. FIG. 9 depicts a procedure 900 in which a flood-filing technique is used to determine whether to add faces to a segment, e.g., as a developable geometry.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 6-9.

To begin in this example, a 3D mesh 110 is received that is formed using a plurality of vertices 112 (block 902) and a vertex direction 204 is determined for each vertex of the plurality of vertices (block 904) as described in the previous section as part of operation of the direction determination module 202. This is received as an input by the segment generation module 206.

A flood filling process is then begun by the segment generation module 206. As part of this, a vertex selection module 602 of the segment generation module 206 is implemented to select an initial vertex 604 from the plurality of vertices 112 (block 906) that has an associated vertex direction 606 as computed by the direction determination module 202 as shown at the first stage 702 of FIG. 7. This selection may be made by the vertex selection module 602 in a variety of ways. In one example, the initial vertex 604 is chosen based on a probability that the initial vertex 604 is included as part of a developable geometry, e.g., using heuristics. In another example, the initial vertex 604 is selected based on an amount of curvature, e.g., that has a least amount of curvature of the plurality of vertices 112. A variety of other examples are also contemplated.

The initial vertex 604 and associated vertex direction 606 are then passed as an input from the vertex selection module 602 to a face identification module 608. The face identification module 608 is representative of functionality to identify a face 610 that is formed using the initial vertex and at least one other vertex of the plurality of vertices (block 908). As shown at the second stage 704 of FIG. 7, the initial vertex 604 along with a second vertex 710 and third vertex 712 are used to form a face 610 as a triangle. Other face shapes are also contemplated, such as quadrilaterals to form a quadrilateral mesh or other polygons to form a polygon mesh.

A face normal module 612 is then employed to determine a normal 614 of the face 610 (block 910). A normal 614 is defined as a line or vector that is perpendicular to a given object. In three dimensions, a normal 614 is a line normal to a plane forming the face 610 as defined by the initial vertex 604, the second vertex 710, and the third vertex 712 as shown at the third stage 706 of FIG. 7.

A determination is then made by a segment determination module 616 as shown at a fourth stage 708 of FIG. 7 to whether a vertex direction 606 of the initial vertex 604 is orthogonal to the normal 614 of the face 610 within a threshold 714 amount (block 912). The threshold 714 defines an amount of deviation that is permitted between the vertex direction 606 as being considered orthogonal to the normal 614. Thus, the threshold 714 has a direct geometric meaning as to what is a maximal amount of change in an angle of curvature direction between faces that permits the faces to be included within a same segment. This addresses discretization errors that may be encountered and, in an implementation, is user selectable to control how conservative or aggressive the segment determination module 616 is in adding faces to a segment.

Responsive to the determination by the segment determination module 616 that the vertex direction 606 is orthogonal to the normal 614 within the threshold 714 amount (block 914), the face 610 is added to a segment 118 that includes the initial vertex 604 (block 916) and a vertex added from the face 610 to the segment 118 is set as the initial vertex 618 (block 918). In the illustrated example at the fourth stage 708 of FIG. 7, for instance, the face 610 having the initial vertex 604, second vertex 710, and third vertex 712 is added to the segment 118.

Accordingly, the segment determination module 616 also includes the second and third vertices 710, 712 as also included in the face 610 to a queue for subsequent use by the vertex selection module 602. In this way, the geometry segmentation system 116 addresses local amounts of curvature and as such may address shapes such as a swirled ribbon, rather than a global curvature as used in conventional techniques that is not able to do so.

This process may then continue for the other vertices 112 included as part of the face 610 and/or taken from the queue. As shown at a first stage 802 of FIG. 8, for instance, the second vertex 710 of FIG. 7 of the face 610 added to the segment 118 is set as the initial vertex 710 and selected by the vertex selection module 602 The same reference number is used to indicate the second vertex 710 is now the initial vertex 710. The initial vertex 710 is associated with a vertex direction 810. In one example, the vertex direction is determined by the direction determination module 202 as described in the previous section, e.g., as vertex direction 204. In another example, the vertex direction 810 is set as orthogonal to the normal 614 of the face 610 that caused the vertex (e.g., as second vertex 710) to be added to the segment. A variety of other examples are also contemplated.

At the second stage 804, a face 812 is then identified by the face identification module 608 that includes the initial vertex 710 as well as a third vertex 814 and a fourth vertex 816. At the third stage 806, a normal 818 is determined by the face normal module 612, and at the fourth stage 808 a determination is made as whether to include the face 812 as part of the segment 118 by comparing the vertex direction 810 to the normal 818. As before, this may be performed by the segment determination module 616 by determining whether the vertex direction 810 is orthogonal to the normal 818 within a threshold 714 amount. This flood filling process may repeat until a stopping condition 620 is reached, e.g., there are no more vertices having associated faces to add to the segment 118. The segment 118 and the faces 610 forming the segment are then output to a segmentation processing system 120, e.g., for use by a UI selection module 122, shape-inference module 124, texture module 126, and so on. In this way, the geometry segmentation system 116 may address and overcome challenges of conventional techniques to generate developable geometries that are not possible using conventional techniques, such as for a swirled ribbon.

For example, in one conventional example, given an error bound "e" and a global curvature direction "d", a patch is grown with all faces in that patch orthogonal to d, up to e. Hence, if a low bound is set of "e" in the aim of capturing developable geometries in this conventional example, many developable geometries that cannot be described by one direction "d" (e.g., anything other than a cone or a cylinder, such as a swirled ribbon) will not be received. Therefore, conventional examples, such as D-charts, use a single global parameter to decide which triangles belong to a patch and which do not, whereas in the techniques described herein a different curvature direction is assigned as used for each vertex. The meaning of "d" as well as the criteria and steps for flood filling also differ from these conventional approaches.

Example System and Device

Figure 10:
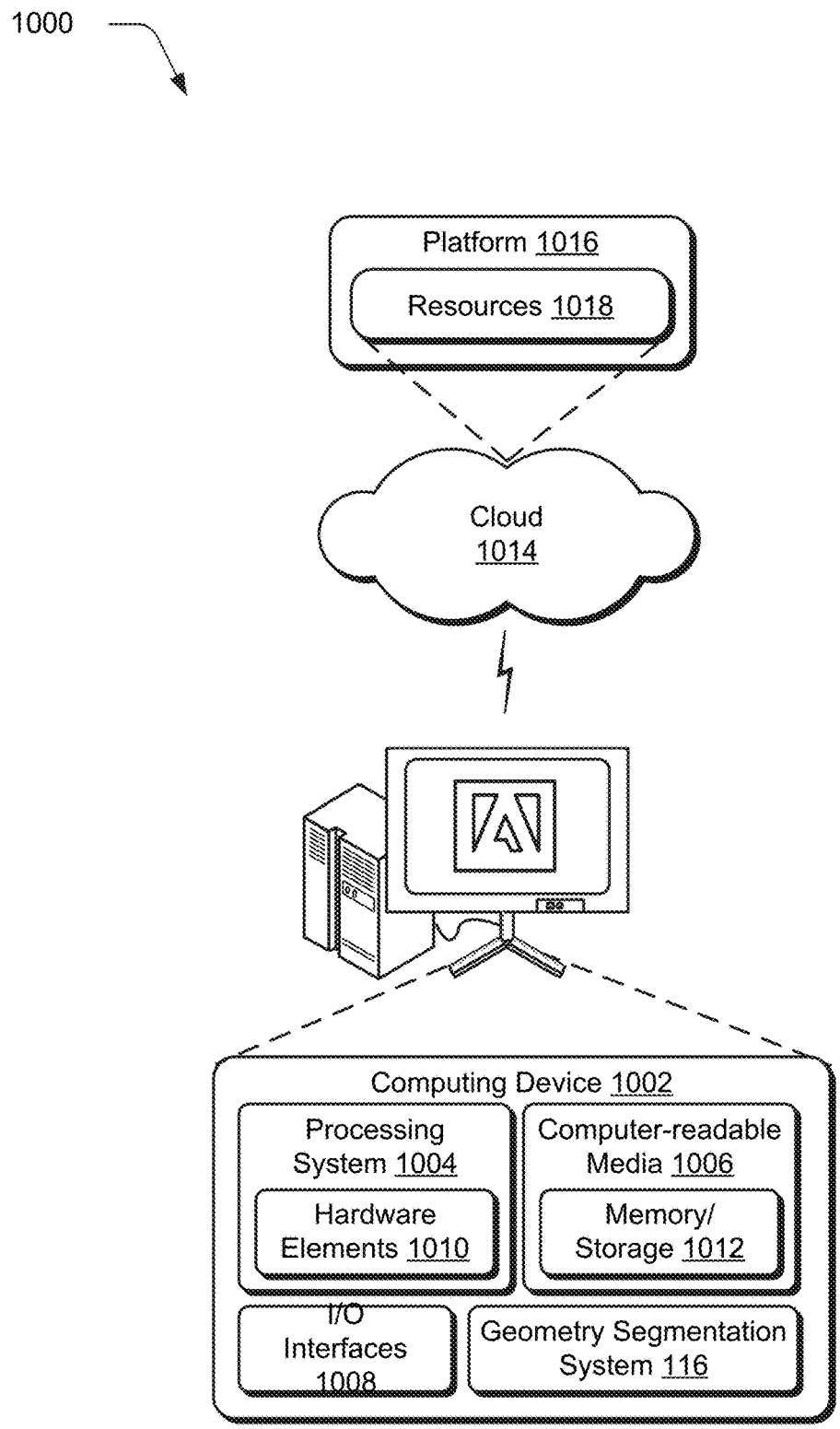
FIG. 10 illustrates an example system including various components of an example device that can be implemented as any type of computing device as described and/or utilized with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the geometry segmentation system 116. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium three-dimensional (3D) mesh segmentation environment, a method implemented by a computing device, the method comprising:
   identifying, by the computing device, a first face formed using a first vertex and a second vertex of a plurality of vertices forming a 3D mesh, the first vertex associated with a first curvature direction;
   calculating, by the computing device, a first face direction from the first face;
   determining, by the computing device, the first curvature direction is within a threshold amount of the first face direction;

adding, by the computing device, the first face to a segment responsive to the determining;

calculating, by the computing device, a second face direction from a second face formed using the second vertex;

adding, by the computing device, the second face to a segment responsive to determining a second curvature direction associated with the second vertex is within a threshold amount of the second face direction; and outputting, by the computing device, the segment having the first and second faces.

2. The method as described in claim 1, wherein the segment is a developable geometry of the 3D mesh that is configured to be flattened onto a plane without stretching or shearing the segment.

3. The method as described in claim 1, wherein the first curvature direction exhibits a least amount of curvature of a plurality of candidate directions of curvature in the 3D mesh for the first vertex.

4. The method as described in claim 1, further comprising determining, by the computing device, the first curvature direction of the first vertex by:

generating a plurality of candidate directions having an amount of curvature based on the 3D mesh; and setting the curvature direction based on a candidate direction of the plurality of candidate directions that exhibits, respectively, a least amount of curvature.

5. The method as described in claim 1, wherein the first face direction is a normal that is orthogonal to the first face and the second face direction is a normal that is orthogonal to the second face.

6. The method as described in claim 1, wherein the threshold specifies a permissible amount of deviation.

7. The method as described in claim 1, further comprising generating, by the computing device, a two-dimensional (2D) texture map of the segment by mapping the segment using UV coordinates.

8. The method as described in claim 7, further comprising:

receiving, by the computing device, an input indicating a texture to be applied to the two-dimensional texture map;

applying, by the computing device, the texture to the 3D mesh based on the texture map; and rendering, by the computing device, the 3D mesh as having the texture based on the texture map.

9. In a digital medium three-dimensional (3D) mesh segmentation environment, a method implemented by a computing device, the method comprising:

generating, by the computing device, a segment from a 3D mesh formed using a plurality of vertices, the generating including:

selecting a vertex from the plurality of vertices, the selected vertex associated with a curvature direction;

identifying a face formed using the selected vertex and at least one other vertex of the plurality of vertices;

calculating a direction based on the face;

determining the curvature direction of the selected vertex is within a threshold amount of the direction calculated based on the face; and adding the face to the segment responsive to the determining; and outputting, by the computing device, the segment.

10. The method as described in claim 9, wherein the segment is a developable geometry of the 3D mesh that is configured to be flattened onto a plane without stretching or shearing the segment.

11. The method as described in claim 9, wherein the curvature direction exhibits a least amount of curvature of a plurality of candidate directions of curvature in the 3D mesh for the selected vertex.

12. The method as described in claim 9, further comprising determining, by the computing device, the curvature direction of the selected vertex by:

generating a plurality of candidate directions having an amount of curvature based on the 3D mesh; and setting the curvature direction based on a candidate direction of the plurality of candidate directions that exhibits, respectively, a least amount of curvature.

13. The method as described in claim 9, wherein the direction is a normal that is orthogonal to the face.

14. The method as described in claim 9, wherein the threshold specifies a permissible amount of deviation.

15. The method as described in claim 9, further comprising generating, by the computing device, a two-dimensional (2D) texture map of the segment by mapping the segment using UV coordinates.

16. The method as described in claim 15, further comprising:

receiving, by the computing device, an input indicating a texture to be applied to the two-dimensional texture map;

applying, by the computing device, the texture to the 3D mesh based on the texture map; and rendering, by the computing device, the 3D mesh as having the texture based on the texture map.

17. A computing device comprising:

a processing system; and a non-transitory computer-readable storage medium having instructions stored thereon that, responsive to execution by the processing system, causes the processing system to perform operations including:

identifying a first face formed using a first vertex and a second vertex of a plurality of vertices forming a 3D mesh, the first vertex associated with a first curvature direction;

calculating a first face direction from the first face;

adding the first face to a segment responsive to determining the first curvature direction is within a threshold amount of the first face direction;

calculating a second face direction from a second face formed using the second vertex; and adding the second face to a segment responsive to determining a second curvature direction associated with the second vertex is within a threshold amount of the second face direction.

18. The computing device as described in claim 17, wherein the segment is a developable geometry of the 3D mesh that is configured to be flattened onto a plane without stretching or shearing the segment.

19. The computing device as described in claim 17, wherein the first curvature direction exhibits a least amount of curvature of a plurality of candidate directions of curvature in the 3D mesh for the first vertex.

20. The computing device as described in claim 17, further comprising determining the first curvature direction of the first vertex by:

generating a plurality of candidate directions having an amount of curvature based on the 3D mesh; and setting the first curvature direction based on a candidate direction of the plurality of candidate directions that exhibits, respectively, a least amount of curvature.

* * * * *